(12) United States Patent
Tsai et al.

(10) Patent No.: US 12,487,497 B2
(45) Date of Patent: Dec. 2, 2025

(54) ELECTROPHORETIC DISPLAY DEVICE AND METHOD FOR MANUFACTURING THE SAME

(71) Applicant: E Ink Holdings Inc., Hsinchu (TW)

(72) Inventors: Shu-Fen Tsai, Zhubei (TW); Hsien-Yi Hsiao, Hsinchu (TW); Ming-Kai Chuang, Zhubei (TW); Puru Howard Shieh, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 646 days.

(21) Appl. No.: 17/576,206

(22) Filed: Jan. 14, 2022

(65) Prior Publication Data

US 2022/0244611 A1 Aug. 4, 2022

(30) Foreign Application Priority Data

Feb. 2, 2021 (TW) ................ 110103810

(51) Int. Cl.
*G02F 1/167* (2019.01)
*G02F 1/1679* (2019.01)
*G02F 1/1681* (2019.01)

(52) U.S. Cl.
CPC ............ *G02F 1/167* (2013.01); *G02F 1/1679* (2019.01); *G02F 1/1681* (2019.01)

(58) Field of Classification Search
CPC ...... G02F 1/167; G02F 1/1679; G02F 1/1681; G02F 1/16766
See application file for complete search history.

(56) References Cited

U.S. PATENT DOCUMENTS

| | | | |
|---|---|---|---|
| 7,116,318 B2 | 10/2006 | Amundson et al. |
| 7,531,962 B2 | 5/2009 | Kunii et al. |
| 7,605,799 B2 | 10/2009 | Amundson et al. |
| 9,214,640 B2 | 12/2015 | Lee et al. |
| 9,621,692 B2 | 4/2017 | Lee |
| 10,172,233 B2 | 1/2019 | Chung et al. |
| 10,510,816 B2 | 12/2019 | Kim et al. |
| 10,561,027 B2 | 2/2020 | Kim et al. |

(Continued)

FOREIGN PATENT DOCUMENTS

| | | |
|---|---|---|
| CN | 102375282 A | 3/2012 |
| CN | 102385214 A | 3/2012 |

(Continued)

*Primary Examiner* — Balram T Parbadia
*Assistant Examiner* — Samanvitha Sridhar
(74) *Attorney, Agent, or Firm* — Rabin & Berdo, P.C.

(57) ABSTRACT

An electrophoretic display device includes a backplane structure, a buffer layer, a spacer wall, a display medium, an upper substrate and an upper electrode. The backplane structure includes a lower substrate, a transistor formed on the lower substrate, and a lower electrode electrically connected to the transistor. The buffer layer is disposed on the backplane structure. The spacer wall is disposed on the buffer layer and forms a closed pattern. The display medium is disposed in the closed pattern. The display medium includes an electrophoretic medium and a plurality of electrophoretic particles dispersed in the electrophoretic medium. The upper substrate is disposed on the spacer wall and the display medium. The upper electrode is disposed between the upper substrate and the spacer wall.

11 Claims, 16 Drawing Sheets

(56) References Cited

U.S. PATENT DOCUMENTS

| | | | |
|---|---|---|---|
| 2004/0032389 A1* | 2/2004 | Liang | G02F 1/1677 |
| | | | 345/107 |
| 2005/0024710 A1 | 2/2005 | Kanbe | |
| 2008/0037106 A1 | 2/2008 | Song | |
| 2011/0299002 A1 | 12/2011 | Won et al. | |
| 2012/0099181 A1* | 4/2012 | Shitagami | G02F 1/167 |
| | | | 445/25 |
| 2012/0200910 A1* | 8/2012 | Hayashi | G02F 1/167 |
| | | | 156/196 |
| 2015/0015934 A1* | 1/2015 | Yamada | G02F 1/1679 |
| | | | 156/146 |
| 2016/0139479 A1* | 5/2016 | Hirai | G02F 1/167 |
| | | | 359/296 |
| 2016/0238918 A1* | 8/2016 | Nakashima | G02F 1/16756 |
| 2017/0068145 A1* | 3/2017 | Nakamura | G02F 1/1679 |
| 2018/0014399 A1 | 1/2018 | Chung et al. | |
| 2018/0031942 A1* | 2/2018 | Koch | G02B 26/007 |
| 2018/0337220 A1 | 11/2018 | Kim et al. | |
| 2020/0119111 A1 | 4/2020 | Kim et al. | |
| 2020/0348576 A1 | 11/2020 | Visani et al. | |

FOREIGN PATENT DOCUMENTS

| | | |
|---|---|---|
| CN | 102645812 A | 8/2012 |
| CN | 106211793 A | 12/2016 |
| CN | 109659315 A | 4/2019 |
| JP | 2015114448 A | 6/2015 |
| KR | 20140015829 A | 2/2014 |

* cited by examiner

ELECTROPHORETIC DISPLAY DEVICE AND METHOD FOR MANUFACTURING THE SAME

This application claims the benefit of Taiwan application Serial No. 110103810, filed Feb. 2, 2021, the subject matter of which is incorporated herein by reference.

BACKGROUND OF THE INVENTION

Field of the Invention

The invention relates in general to a display device and a method for manufacturing the same, and more particularly to an electrophoretic display device and a method for manufacturing the same.

Description of the Related Art

Recently, electrophoretic display devices have become widely used electronic products. Generally speaking, an electrophoretic display device may include a backplane structure and a front plane laminate attached to the backplane structure. The backplane structure includes a transistor array substrate and a lower electrode electrically connected to the transistor. The front plane laminate includes an adhesive layer disposed on a release layer, a display medium layer (including electrophoretic medium and electrophoretic particles) and an upper electrode. After the manufacturing of the front plane laminate is finished, the front plane laminate is torn off from the release layer, and the front plane laminate is attached to the backplane structure through the adhesive layer to form an electrophoretic display device.

However, the above-mentioned manufacturing process for forming an electrophoretic display device is quite complicated, time-consuming, and requires high manufacturing costs. Therefore, there is still an urgent need to develop an electrophoretic display device and a method for manufacturing the same that can improve the above-mentioned problems.

SUMMARY OF THE INVENTION

According to an embodiment of the present invention, an electrophoretic display device is provided. The electrophoretic display device includes a backplane structure, a buffer layer, a spacer wall, a display medium, an upper substrate and an upper electrode. The backplane structure includes a lower substrate, a transistor formed on the lower substrate, and a lower electrode electrically connected to the transistor. The buffer layer is disposed on the backplane structure. The spacer wall is disposed on the buffer layer and forms a closed pattern. The display medium is disposed in the closed pattern. The display medium includes an electrophoretic medium and a plurality of electrophoretic particles dispersed in the electrophoretic medium. The upper substrate is disposed on the spacer wall and the display medium. The upper electrode is disposed between the upper substrate and the spacer wall.

According to another embodiment of the present invention, a method for manufacturing an electrophoretic display device is provided. The method includes the following steps. A backplane structure is provided. The backplane structure includes a lower substrate, a transistor formed on the lower substrate, and a lower electrode electrically connected to the transistor. A buffer layer is deposited on the backplane structure. A spacer wall is formed on the buffer layer by a lithography process, and the spacer wall forms a closed pattern. A display medium is filled in the closed pattern, wherein the display medium includes an electrophoretic medium and a plurality of electrophoretic particles dispersed in the electrophoretic medium. An encapsulation layer is formed on the spacer wall and the display medium. After forming an upper electrode on an upper substrate, a structure formed by the upper electrode and the upper substrate is attached to the encapsulation layer.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
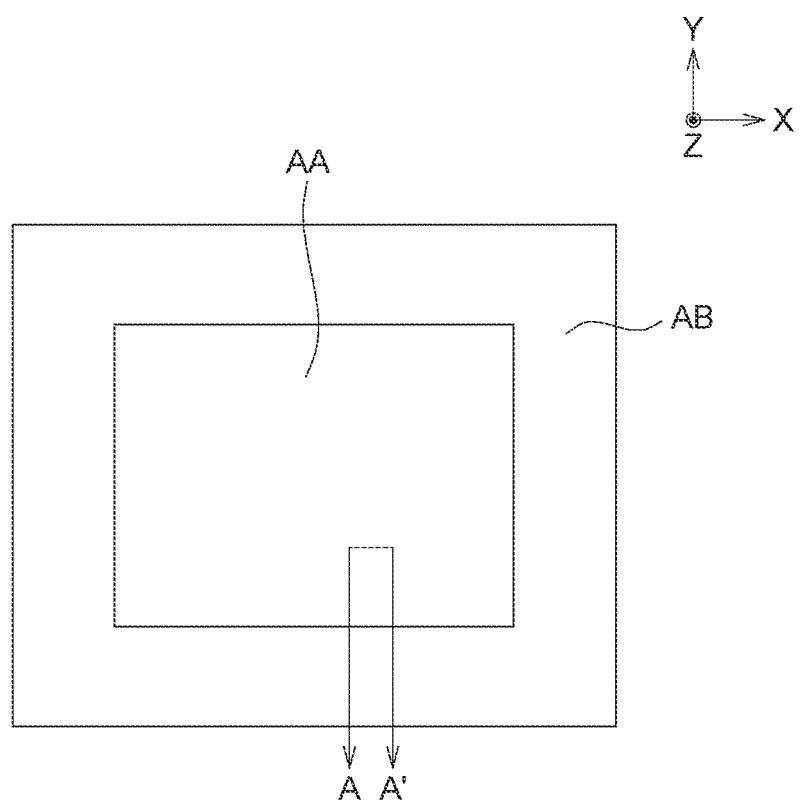
FIG. 1A is a top view showing an electrophoretic display device according to an embodiment of the invention.
Figure 1B:
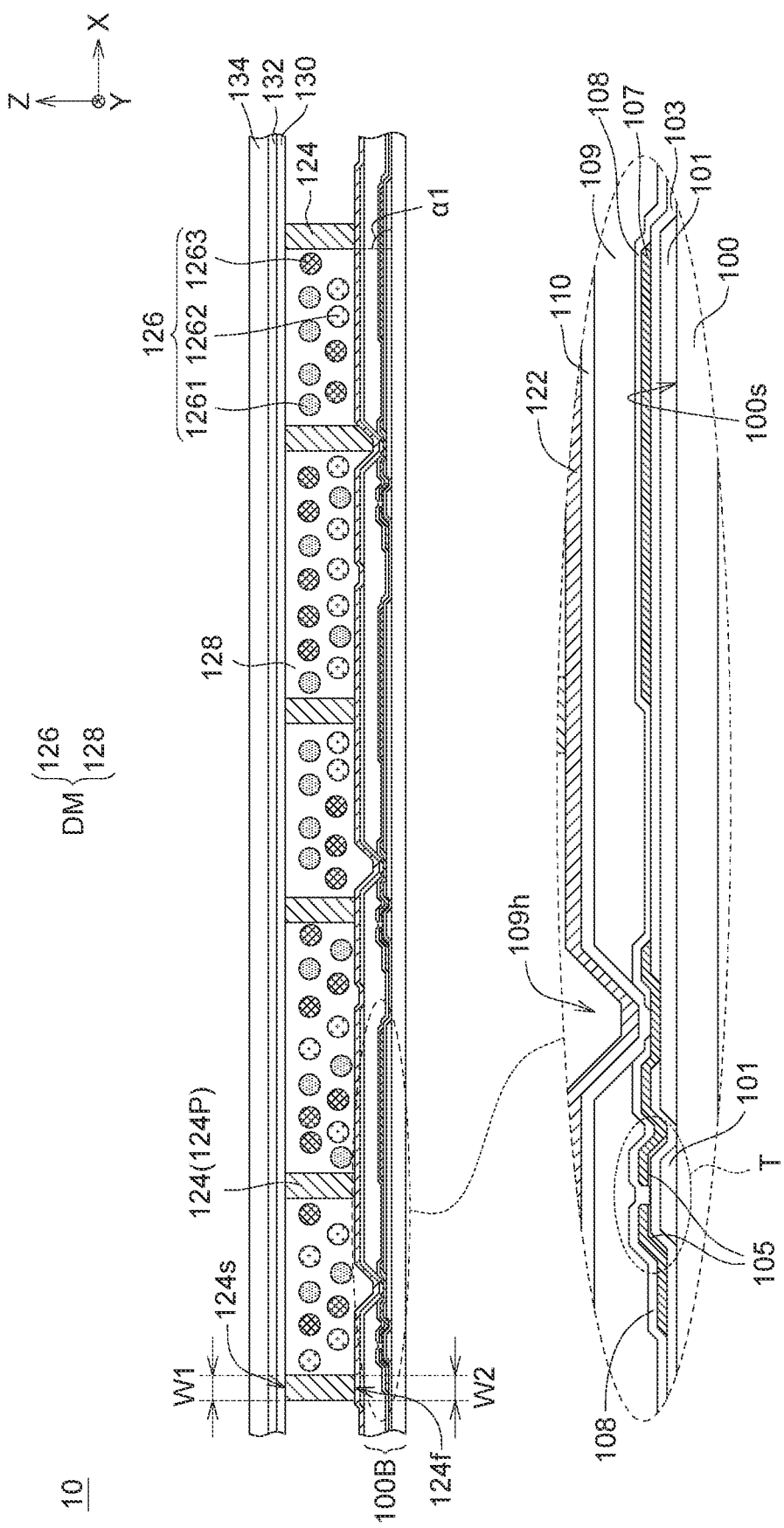
FIG. 1B is a cross-sectional view taken along the line A-A' of FIG. 1A.

FIG. 1A is a top view showing an electrophoretic display device 10 according to an embodiment of the present invention, for example, showing a plane formed by a first direction (for example, X direction) and a second direction (for example, Y direction). FIG. 1B is a cross-sectional view taken along the line A-A' in FIG. 1A, for example, showing a plane formed by the first direction and the third direction (for example, Z direction). The first direction, the second direction, and the third direction may be intersected with each other, for example, the first direction, the second direction, and the third direction being perpendicular to each other.

Referring to FIGS. 1A and 1B, the electrophoretic display device 10 includes a backplane structure 100B, a buffer layer 122, a spacer wall 124, a display medium DM, an encapsulation layer 130, an upper electrode 132, and an upper substrate 134.

The backplane structure 100B includes a lower substrate 100, a plurality of transistors T formed on the lower substrate 100, and a lower electrode 110 electrically connected to the transistor T. The lower substrate 100 is, for example, a glass substrate. The backplane structure 100B is, for example, a thin film transistor array substrate. The structure and manufacturing process of the backplane structure 100B are the same as or similar to that of the conventional thin film transistor array substrate, and will not be described in detail herein. In short, the lower substrate 100 has an upper surface 100s, and the backplane structure 100B includes a first conductive layer 101, a first insulating layer 103, a semiconductor layer 105, a second conductive layer 107, a protective layer 108, a second insulating layer 109 and a lower electrode 110 sequentially stacked on the upper surface 100s. The second insulating layer 109 has a contact hole 109h, and the contact hole 109h exposes a portion of the second conductive layer 107, so that the lower electrode 110 can be electrically connected to the transistor T. The materials of the first conductive layer 101 and the second conductive layer 107 may include metals, such as aluminum, aluminum alloy, copper, copper alloy, silver, silver alloy, or other suitable metals. The material of the first insulating layer 103 may include nitride, such as silicon nitride or other suitable materials. The material of the second insulating layer 109 may include an organic material. The material of the lower electrode 110 may include an opaque conductive material, such as molybdenum (Mo), molybdenum nitride (MoN), molybdenum niobium (MoNb) or other suitable materials. In other embodiments, an indium tin oxide (ITO) layer can be added on the lower electrode. The size of the indium tin oxide layer is sufficient to cover the lower electrode, so the indium tin oxide layer can protect the lower electrode. It has anti-corrosion function. In the present embodiment, since the buffer layer 122 is provided on the lower electrode 110 (detailed below), the buffer layer 122 has the function of protecting the lower electrode 110 and can prevent the lower electrode 110 from being corroded, so there is no need to additionally provide an indium tin oxide layer on the lower electrode 110. In other embodiments, the material of the lower electrode 110 may also be an indium tin oxide (ITO) layer. The lower electrode 110 is, for example, a pixel electrode.

The buffer layer 122 may be disposed on the backplane structure 100B, for example, conformal to the profile of the upper surface of the backplane structure 100B, covering the second insulating layer 109 and the lower electrode 110. In the present embodiment, the thickness of the buffer layer 122 in the second direction remains unchanged, but the present invention is not limited thereto. The material of the buffer layer 122 may include a dielectric material, and the thickness is, for example, between tens of nanometers to hundreds of nanometers. In some embodiments, the buffer layer 122 is made by processes, for example, thin film deposition, photolithography, etching, and photoresist removal.

Figure 4A:
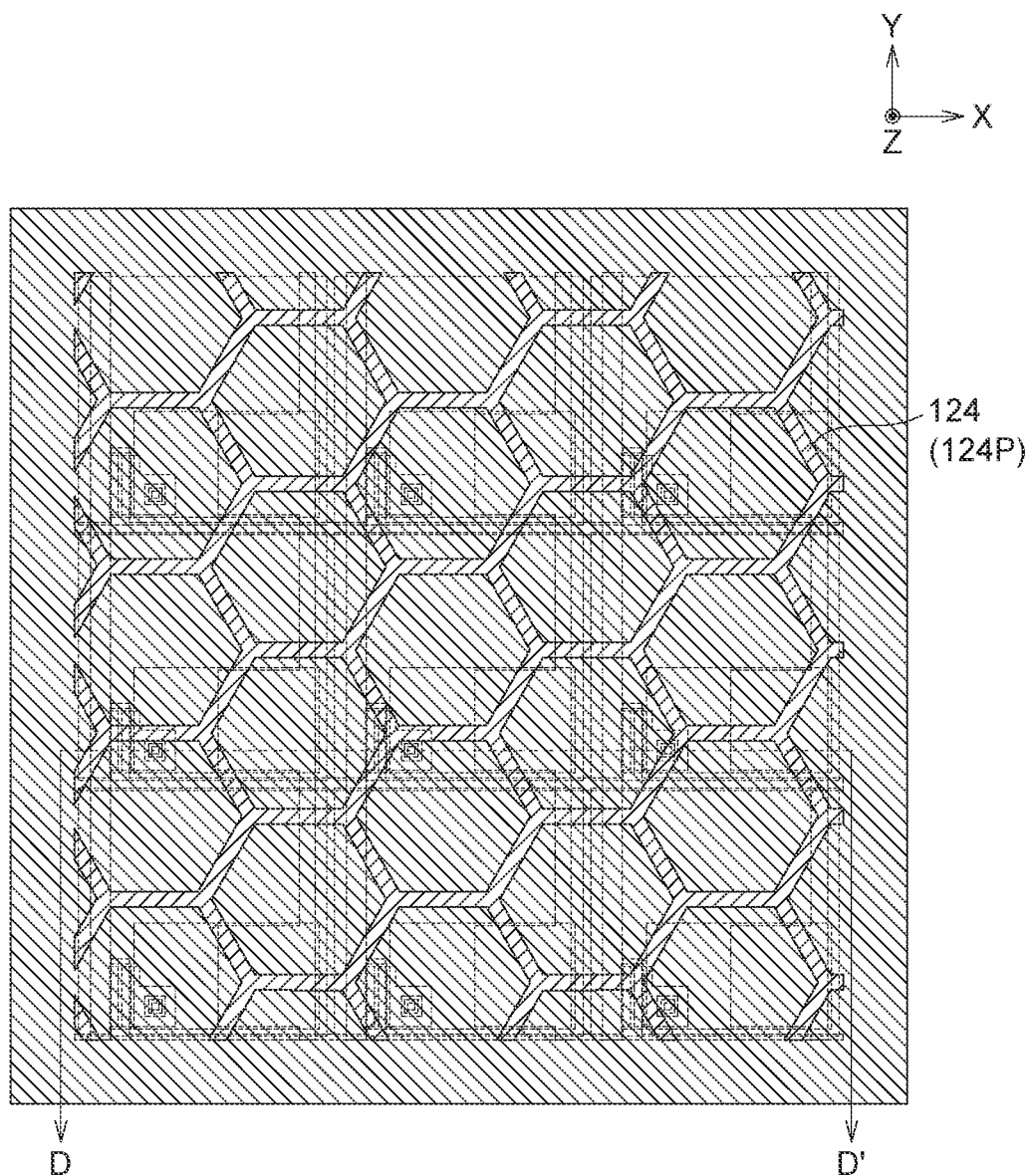

The spacer wall 124 is disposed on the buffer layer 122 and forms a closed pattern 124P (shown in FIG. 4A). The material of the spacer wall 124 may include a photoresist material. Compared with the comparative example without the buffer layer, the buffer layer 122 of the present application can provide better adhesion between the spacer wall 124 and the backplane structure 100B, so that the spacer wall 124 is not easily peeled off from the backplane structure 100B, so the structure of the electrophoretic display device 10 of the present application can be more stable and can have better display quality.

The display medium DM is disposed in the closed pattern 124P formed by the spacer wall 124. The display medium DM includes an electrophoretic medium 128 and a plurality of electrophoretic particles 126 dispersed in the electrophoretic medium 128. The electrophoretic medium 128 is, for example, liquid or gas. The electrophoretic particles 126 can be charged particles of different colors, such as black particles 1261, white particles 1262, and red particles 1263. However, the electrophoretic particles 126 of the present invention are not limited thereto. The electrophoretic particles 126 can be arbitrarily selected from a group consisted of a plurality of red particles, a plurality of yellow particles, a plurality of blue particles, a plurality of green particles, a plurality of black particles, and a plurality of white particles.

In the present embodiment, the encapsulation layer 130 is disposed on the spacer wall 124 and the display medium DM, and is disposed between the upper electrode 132 and the spacer wall 124, but the present invention is not limited thereto. In other embodiments, the electrophoretic display device 10 may not include the encapsulation layer 130. When the electrophoretic display device 10 omits the arrangement of the encapsulation layer 130, it can be replaced by coating the encapsulation sealant on the surroundings (not shown).

The upper substrate 134 is disposed on the spacer wall 124 and the display medium DM. The upper electrode 132 and the encapsulation layer 130 are disposed between the upper substrate 134 and the spacer wall 124, and between the upper substrate 134 and the display medium DM. In some embodiments, the upper substrate 134 is, for example, a flexible plastic substrate or a glass substrate. The material of the flexible plastic substrate may include polyethylene terephthalate (PET).

In the electrophoretic display device 10 in the present application, the transistors T, the lower electrode 110, the buffer layer 122, the display medium DM, the spacer wall 124 and other structures are all manufactured on the lower substrate 100, which belong to in-cell electrophoresis display device. Compared with the comparative example in which the front plane laminate is peeled off from the release layer after the structure of the front plane laminate is formed, and the adhesive layer of the front plane laminate and the back plane structure are pressed together, the manufacturing processes of all the structures of the electrophoretic display device 10 in the present application are integrated on a single substrate (that is, the lower substrate 100), the process efficiency is better, and the problem of complicated processes, the time-consuming issue and high cost can be improved.

Figure 2A:
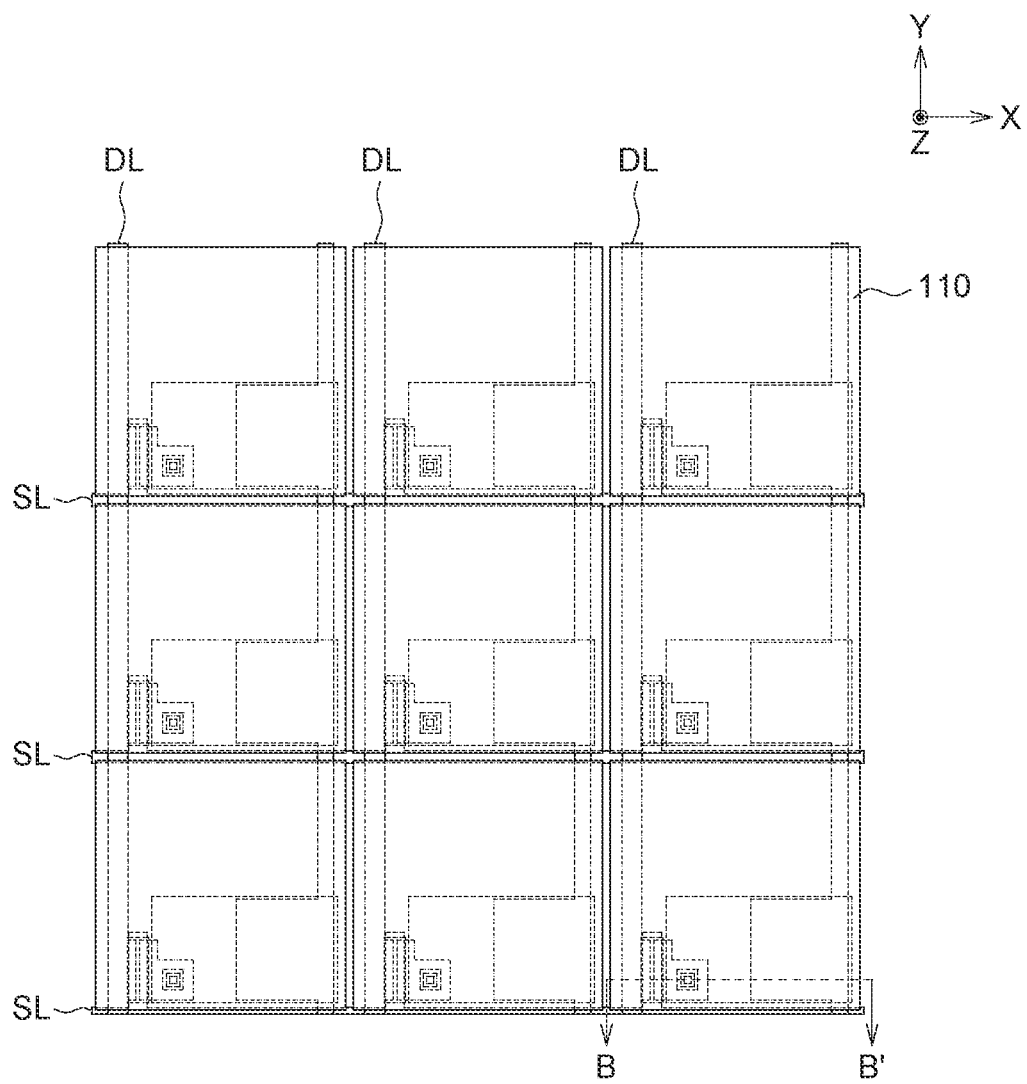
FIGS. 2A to 4B illustrate a method for manufacturing an electrophoretic display device according to an embodiment of the present invention.
Figure 2B:
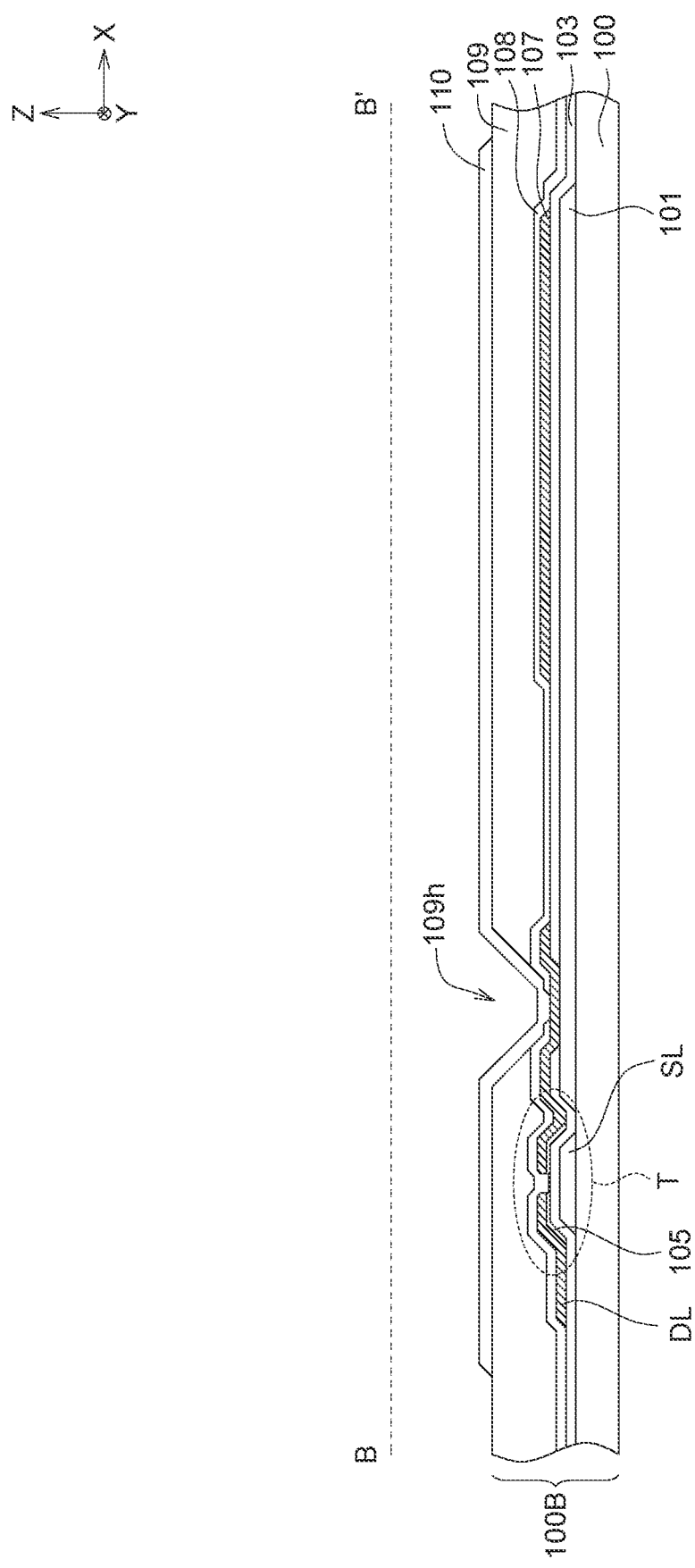
Figure 3A:
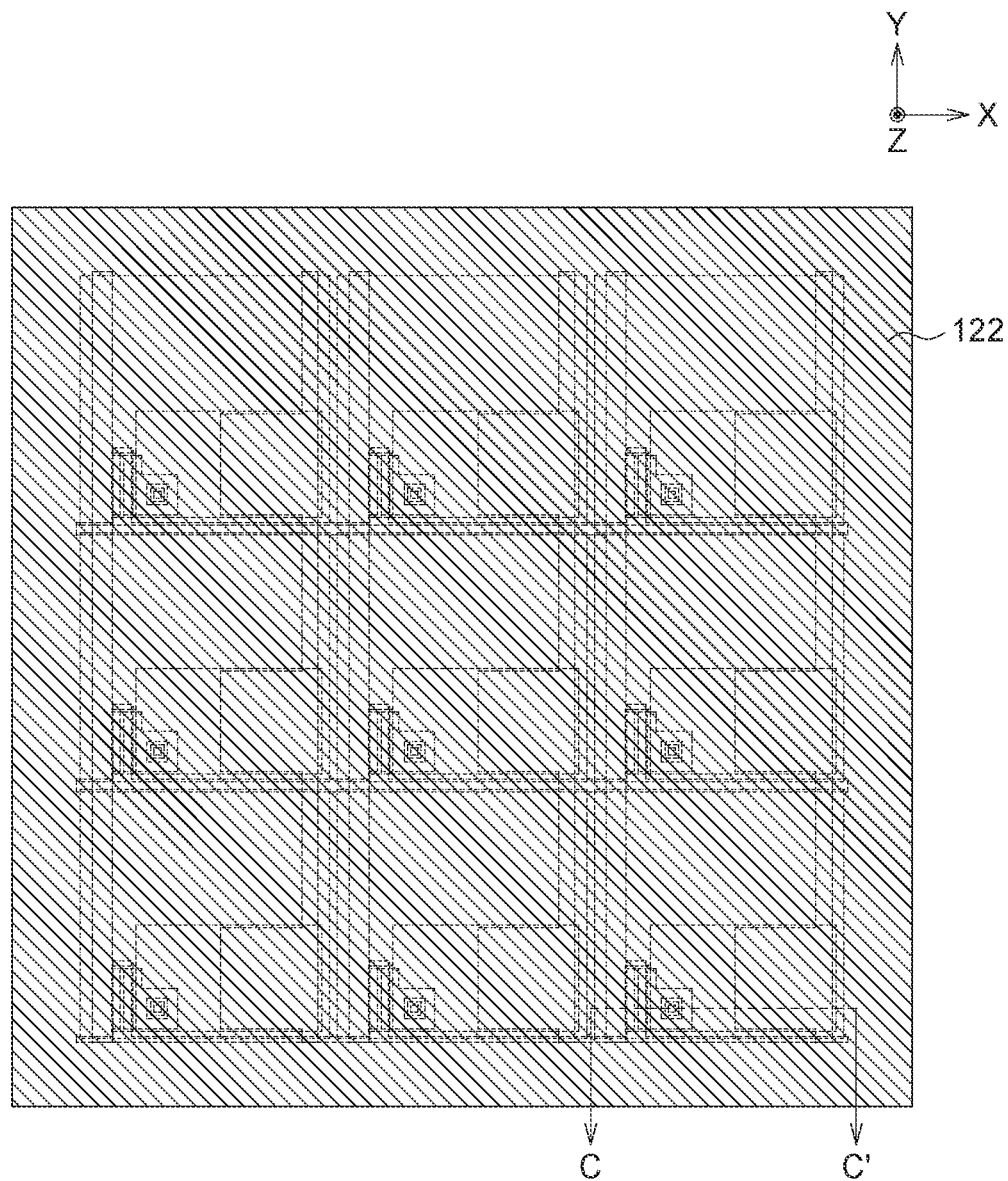
Figure 3B:
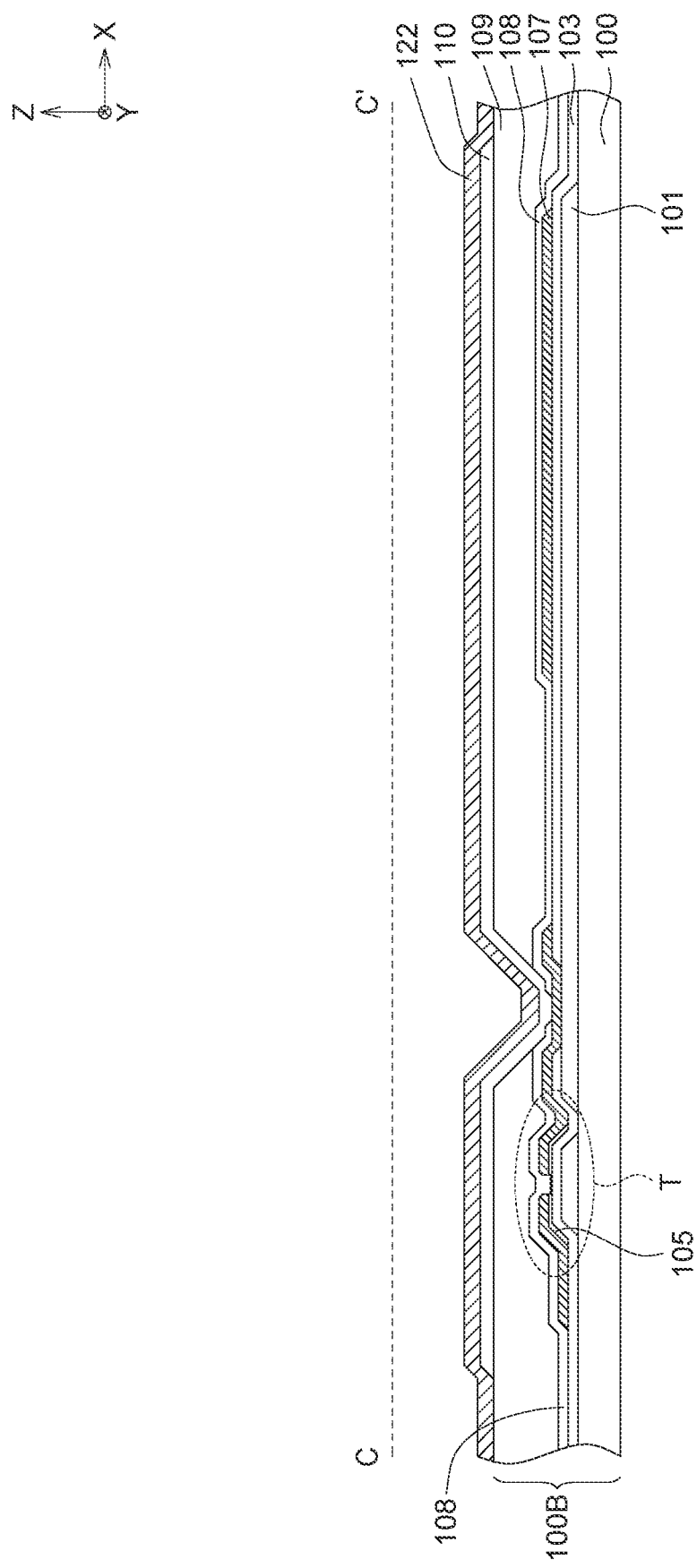
Figure 4B:
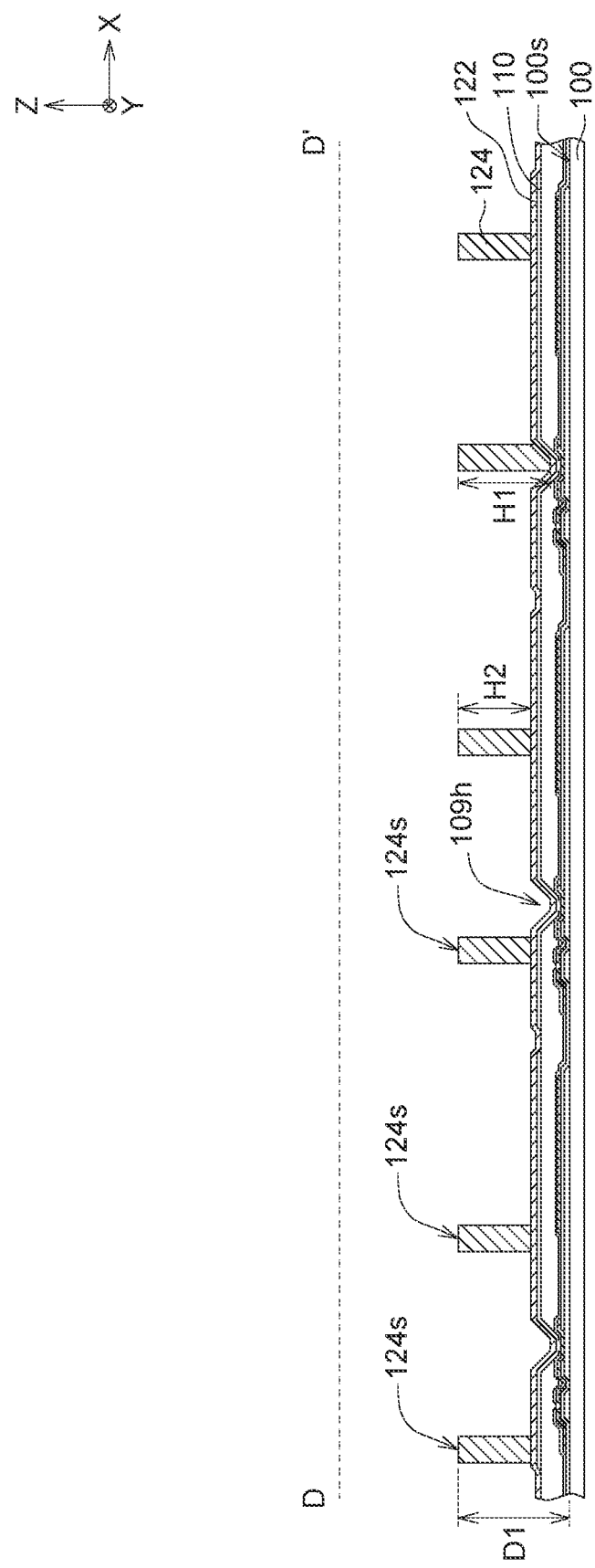
Figure 5A:
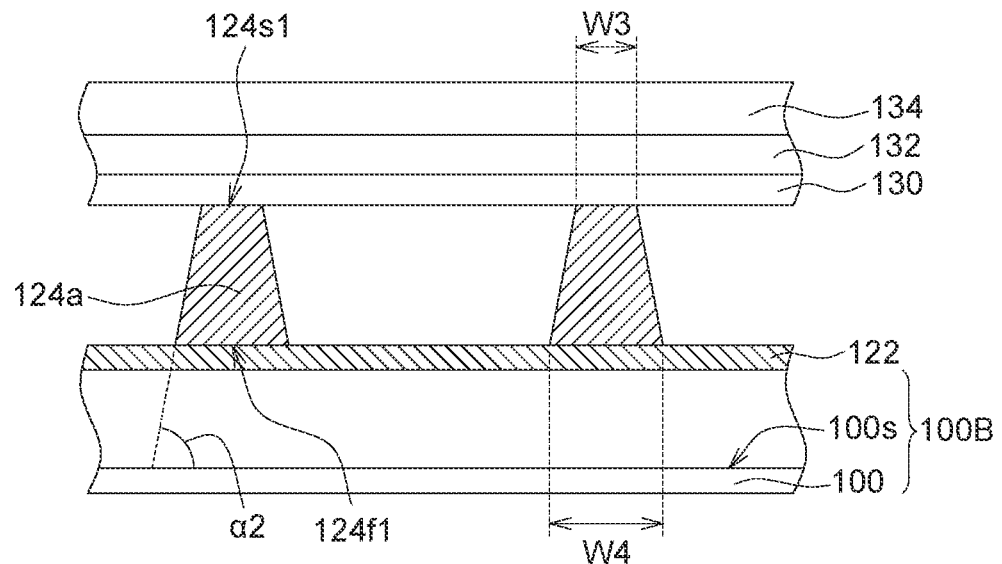
FIG. 5A is a cross-sectional view showing a spacer wall according to another embodiment of the present invention.
Figure 5B:
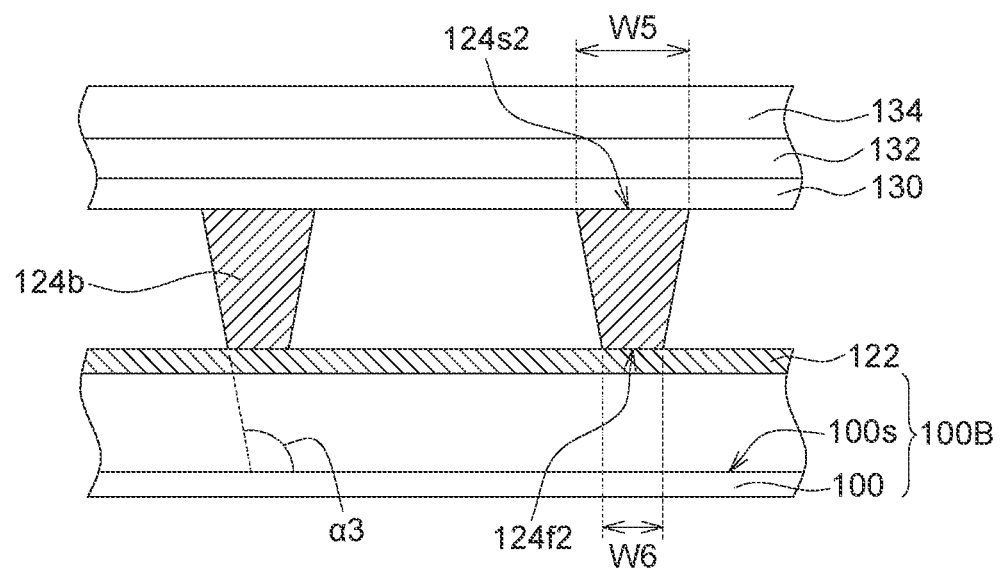
FIG. 5B is a cross-sectional view showing a spacer wall according to further embodiment of the present invention.

FIGS. 2A to 4B illustrate a method for manufacturing an electrophoretic display device 10 according to an embodiment of the present invention, wherein FIGS. 2A, 3A, and 4A show the plane formed by the first direction and the second direction (i.e. a top view), FIGS. 2B, 3B, and 4B show the plane formed by the first direction and the third direction, and are cross-sectional views taken along the line B-B' in FIG. 2A, the line C-C' in FIG. 3A and the line D-D' FIG. 4A, respectively. FIG. 5A is a cross-sectional view showing the spacer wall 124a according to another embodiment of the present invention. FIG. 5B is a cross-sectional view showing the spacer wall 124b according to a further embodiment of the present invention.

First, referring to FIGS. 2A and 2B, a backplane structure 100B is provided. The backplane structure 100B includes a lower substrate 100, a plurality of transistors T formed on the lower substrate 100, a plurality of data lines DL, a plurality of scan lines SL, and a lower electrode 110 electrically connected to the transistor T. In FIG. 2B, the data line DL is disposed on the leftmost side of the second conductive layer 107, for example. The data lines DL and the scan lines SL are interlaced with each other to form a plurality of pixels. As described in FIG. 1B, the lower substrate 100 has an upper surface 100s, and the backplane structure 100B includes a first conductive layer 101, a first insulating layer 103, a semiconductor layer 105, a second conductive layer 107, a second insulating layer 109 and a lower electrode 110 sequentially stacked on the upper surface 100s. The second insulating layer 109 has a contact hole 109h, and the contact hole 109h exposes a portion of the second conductive layer 107, so that the lower electrode 110 can be electrically connected to the transistor T. Other detailed materials and forming methods will not be repeated.

Thereafter, referring to FIGS. 3A and 3B, a buffer layer 122 is deposited on the backplane structure 100B. The buffer layer 122 may extend in a display area AA and a portion of a non-display area AB (as shown in FIG. 8B). The buffer layer 122 is, for example, conformal to the profile of the upper surface of the backplane structure 100B, and covers the second insulating layer 109 and the lower electrode 110. In the present embodiment, the thickness of the buffer layer 122 in the third direction remains unchanged, but the present invention is not limited thereto. The material of the buffer layer 122 may include a dielectric material.

Referring to FIGS. 4A and 4B, a spacer wall 124 is formed on the buffer layer 122 by a lithography process, and the spacer wall 124 forms a plurality of closed patterns 124P. The closed patterns 124P are patterns arranged regularly. The material of the spacer wall 124 may include a photoresist material. In the display area AA, a portion of the buffer layer 122 is covered by the spacer wall 124, and the other portion of the buffer layer 122 is exposed from the inside of the closed pattern 124P formed by the spacer wall 124. The buffer layer 122 is disposed between the spacer wall 124 and the lower electrode 110. The spacer wall 124 may directly contact the buffer layer 122 without contacting the lower electrode 110. Compared with the comparative example without the buffer layer, the buffer layer 122 in the present application provides better adhesion to the spacer wall 124.

In the top view as shown in FIG. 4A, the closed patterns 124P are formed by arrangements of at least one type of polygons. Polygons are, for example, rectangles, pentagons, hexagons or other suitable geometric figures. As long as it is a closed geometric figure, it falls within the scope of protection intended by the present application. According to the present embodiment, in the top view as shown in FIG. 4A, the spacer wall 124 forms a plurality of closed patterns 124P, and each of closed patterns 124P is a polygon, such as a hexagon; that is, the shape of each of closed patterns 124P are the same as each other, for example, are arranged by a plurality of hexagons with the same size, but the present invention is not limited thereto. In some embodiments, the closed patterns 124P can be formed by arrangements of two or more types of polygons. For example, the closed patterns 124P can be formed by arrangements of pentagons and hexagons. The position of the spacer wall 124 can be adjusted according to the design, and the heights of the spacer wall 124 in the third direction can be the same or different from each other. Please refer to FIG. 4B. In the present embodiment, when the spacer wall 124 extends to the contact hole 109h, the spacer wall 124 may have a first height H1. When the spacer wall 124 extends to the area which is at the outside of the contact hole 109h, the spacer wall 124 may have a second height H2, and the first height H1 may be greater than the second height H2, but the present invention is not limited thereto.

As shown in FIG. 4B, the spacer wall 124 has a plurality of upper surfaces 124s, and the upper surfaces 124s are coplanar with each other; that is, no matter where the spacer wall 124 extends, a distance D1 between the upper surface 124s of the spacer wall 124 and the upper surface 100s of the lower substrate 100 can remain unchanged.

Please refer back to FIGS. 1A and 1B. After the closed patterns 124P of the spacer wall 124 are formed, a display medium DM is filled in the closed patterns 124P. The display medium DM includes an electrophoretic medium 128 and a plurality of electrophoretic particles 126 dispersed in the electrophoretic medium 128. The electrophoretic medium 128 is, for example, liquid or gas. The electrophoretic particles 126 may be charged particles of different colors, such as black particles 1261, white particles 1262, and red particles 1263. However, the electrophoretic particles 126 of the present invention are not limited thereto. Thereafter, an encapsulation layer 130 is formed on the spacer wall 124 and the display medium DM. Next, after the upper electrode 132 is formed on the upper substrate 134, the structure formed by the upper electrode 132 and the upper substrate 134 is attached to the encapsulation layer 130 to form the electrophoretic display device 10. The encapsulation layer 130 and the upper electrode 132 are formed between the upper substrate 134 and the spacer wall 124. The encapsulation layer 130 is formed between the upper electrode 132 and the spacer wall 124. In the present embodiment, the spacer wall 124 and the lower electrode 110 overlap each other in the third direction, but the present invention is not limited thereto, and it depends on the design of the size and shape of the closed patterns 124P. In some embodiments, silver dot conductive glue (not shown) can be used for signal conduction between the upper electrode 132 and the lower substrate 100.

In the present embodiment, an angle α1 formed between the spacer wall 124 and an upper surface 100s of the lower substrate 100 is 90 degrees, and a width W1 of the upper surface 124s of the spacer wall 124 may be the same as a width W2 of a lower surface 124f of the spacer wall 124 (as shown in FIG. 1B), but the present invention is not limited thereto. The angle α1 (for example, the inner included angle) between the spacer wall 124 and the upper surface 100s of the lower substrate 100 may be between 80 degrees and 90 degrees. As shown in FIG. 5A, an angle α2 between the spacer wall 124a and the upper surface 100s of the lower substrate 100 may be smaller than 90 degrees. A width W3 of the upper surface 124s1 of the spacer wall 124a may be different from a width W4 of the lower surface 124f1 of the spacer wall 124a. For example, the width W3 of the upper surface 124s1 of the spacer wall 124a may be smaller than the width W4 of the lower surface 124f1 of the spacer wall 124a. In other embodiments, as shown in FIG. 5B, an angle α3 between the spacer wall 124b and the upper surface 100s of the lower substrate 100 may be greater than 90 degrees, and a width W5 of the upper surface 124s2 of the spacer wall 124b is greater than a width W6 of the lower surface 124f2 of the spacer wall 124b. Compared with the embodiment shown in FIG. 5A, the embodiment shown in FIG. 1B has a better condition for manufacturing process, for example, a better effect of sealing the display medium DM, since the angle α1 between the spacer wall 124 and the upper surface 100s of the lower substrate 100 is greater than 80 degrees.

Figure 6A:
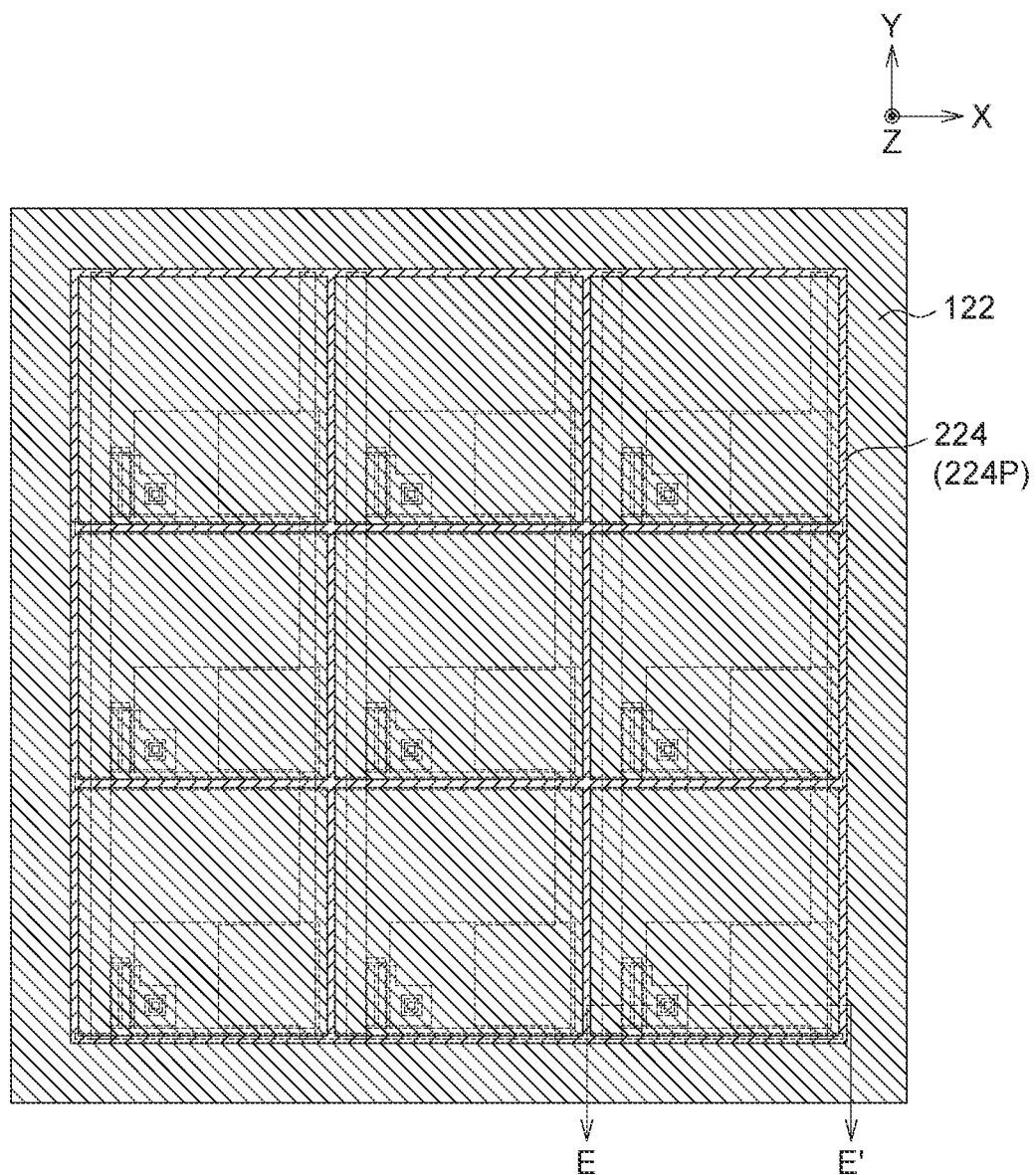
FIGS. 6A to 7 illustrate a method for manufacturing an electrophoretic display device according to a further embodiment of the present invention.
Figure 6B:
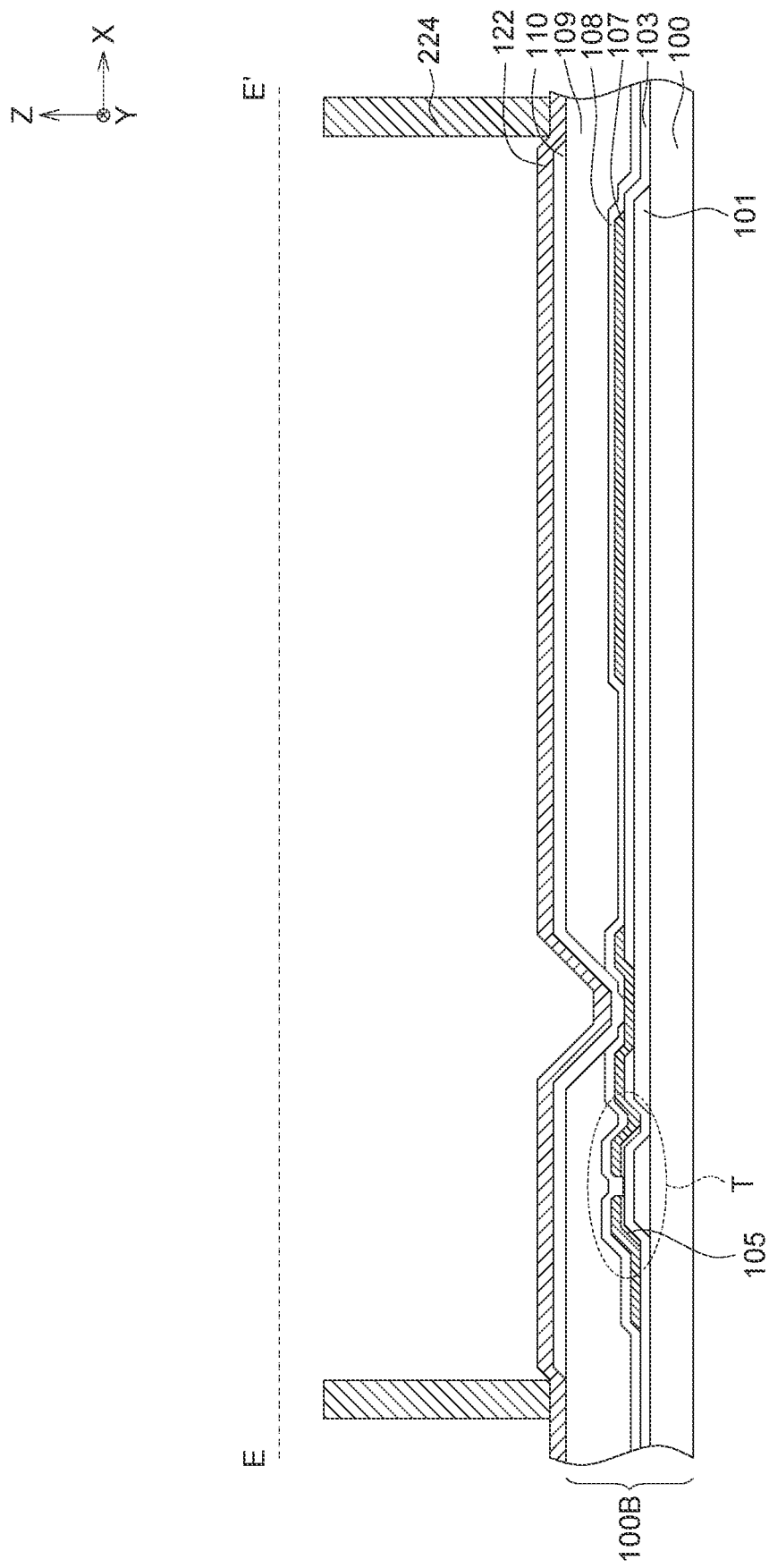
Figure 7:
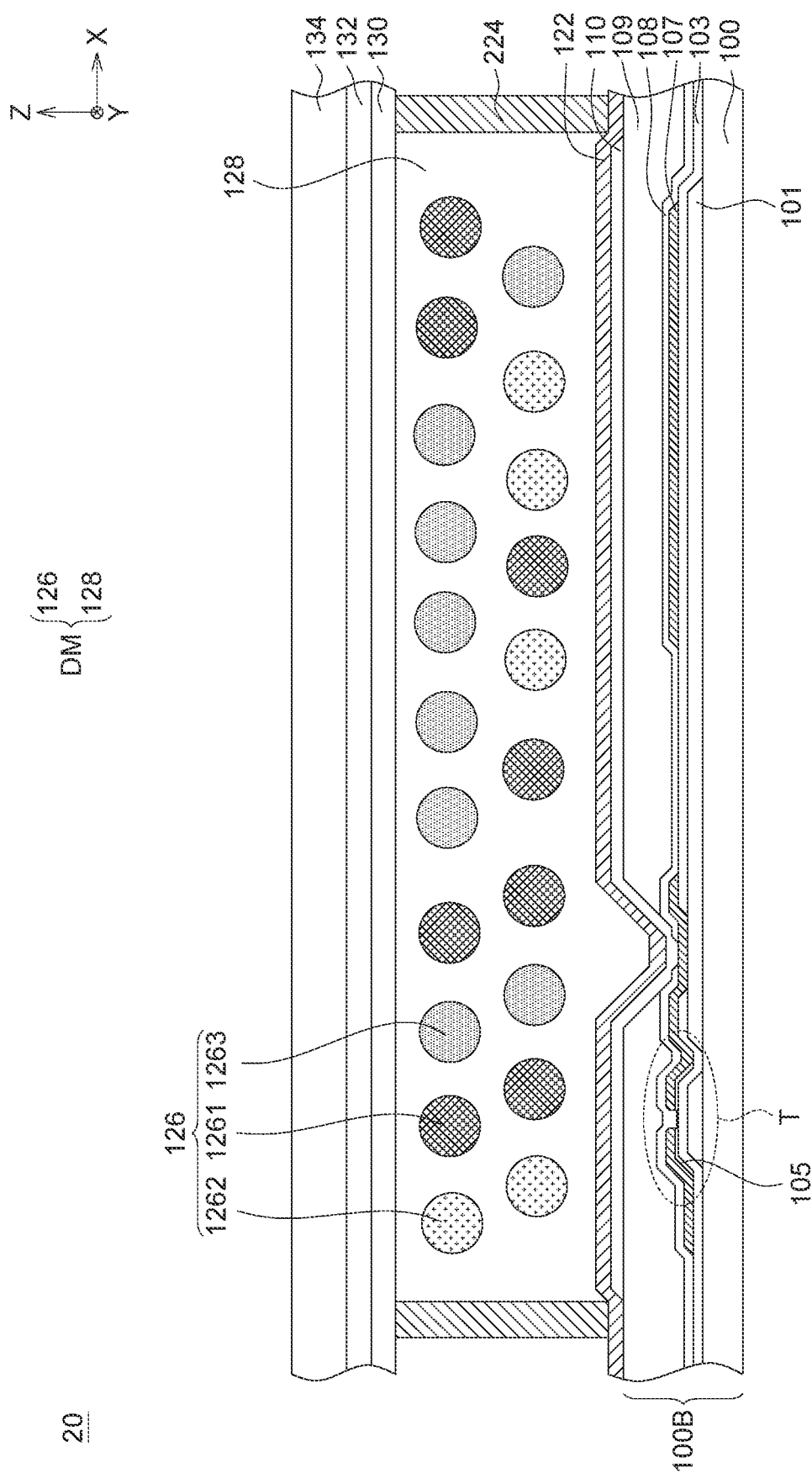

FIGS. 6A-7 illustrate a method for manufacturing an electrophoretic display device 20 according to a further embodiment of the present invention. FIG. 6A shows the plane formed by the first direction and the second direction, and FIGS. 6B and 7 show the plane formed by the first direction and the third direction.

After finishing the process shown in FIGS. 2A to 3B, please continue to refer to FIGS. 6A and 6B. A spacer wall 224 is formed on the buffer layer 122 by a lithography process, and the spacer wall 224 is formed into a plurality of closed patterns 224P. The closed patterns 224P are patterns arranged regularly. The material of the spacer wall 224 may include a photoresist material. In the display area AA, a portion of the buffer layer 122 is covered by the spacer wall 224, and the other portion of the buffer layer 122 is exposed from the inside of the closed patterns 224P formed by the spacer wall 224. The buffer layer 122 is disposed between the spacer wall 224 and the lower electrode 110. The spacer wall 224 may directly contact the buffer layer 122 without contacting the lower electrode 110. Compared with the comparative example without the buffer layer, the buffer layer 122 of the present application provides better adhesion to the spacer wall 224.

In the top view as shown in FIG. 6A, the closed patterns 224P are arranged by rectangles of the same size. The spacer wall 224 is, for example, arranged at the edge of the pixel, but the invention is not limited thereto. In the present embodiment, the spacer wall 224 and the lower electrode 110 are separated from each other (that is, non-overlapping) in the third direction. However, the present invention is not limited thereto. In some embodiments, the spacer wall 224 and the lower electrode 110 can overlap each other (not shown) in the third direction depending on the size and shape of the closed patterns 224P.

Please refer to FIG. 7, after the closed patterns 224P of the spacer wall 224 are formed, a display medium DM is filled in the closed patterns 224P, wherein the display medium DM includes an electrophoretic medium 128 and a plurality of electrophoretic particles 126 dispersed in the electrophoretic medium 128. Similarly, the electrophoretic particles 126 may include black particles 1261, white particles 1262, and red particles 1263, but the electrophoretic particles 126 of the present invention are not limited thereto. Thereafter, an encapsulation layer 130 is formed on the spacer wall 224 and the display medium DM. Next, after the upper electrode 132 is formed on the upper substrate 134, the structure formed by the upper electrode 132 and the upper substrate 134 is attached to the encapsulation layer 130 to form the electrophoretic display device 20. The elements of the electrophoretic display device 20 that are the same as those of the electrophoretic display device 10 use the same element symbols, and the features of the same elements will not be described repeatedly.

In the present embodiment, the encapsulation layer 130 is disposed on the spacer wall 224 and the display medium DM, and is disposed between the upper electrode 132 and the spacer wall 224, but the present invention is not limited thereto. In other embodiments, the electrophoretic display device 20 may not include the encapsulation layer 130. When the electrophoretic display device 20 omits the arrangement of the encapsulation layer 130, it can be replaced by coating the encapsulation sealant on the surroundings (not shown).

In the manufacturing methods of the electrophoretic display devices 10 and 20 of the present invention, after forming the backplane structure 100B including the lower substrate 100, the transistors T, the lower electrode 110 and other elements, the structures including the buffer layer 122, the display medium DM, the spacer wall 124 and the like are directly formed on the backplane structure 100B, that is, the above-mentioned process steps are all manufactured on the lower substrate 100 to form an in-cell electrophoretic display device. Compared with the comparative example in which the front plane laminate is torn off from the release layer after the structure of the front plane laminate is formed, and the adhesive layer of the front plane laminate and the back plane structure are pressed together, the methods for manufacturing the electrophoretic display devices 10 and 20 of the present invention omit the step of forming an adhesive layer on the release layer, the step of peeling the front plane laminate including the adhesive layer from the release layer, and the step of bonding the front plane laminate and the backplane structure to each other through the adhesive layer are omitted. Therefore, in the methods for manufacturing the electrophoretic display devices 10 and 20 of the present application, the manufacturing processes of all the structures are integrated on a single substrate (that is, the lower substrate 100), and the process efficiency is better, which can improve the problems of complicated, time-consuming and high-cost manufacturing process.

Figure 8A:
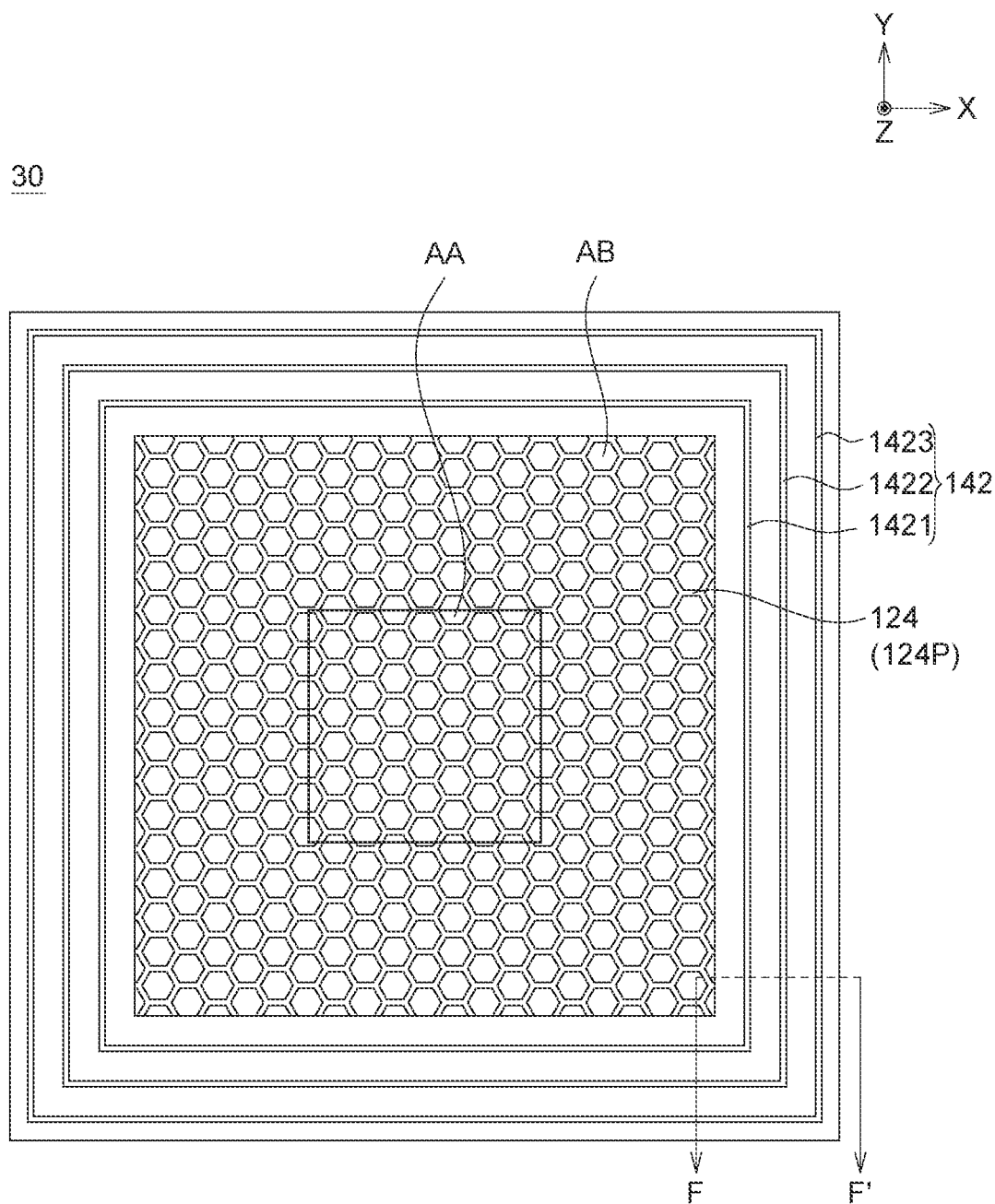
FIG. 8A is a top view showing an electrophoretic display device according to a further embodiment of the present invention.
Figure 8B:
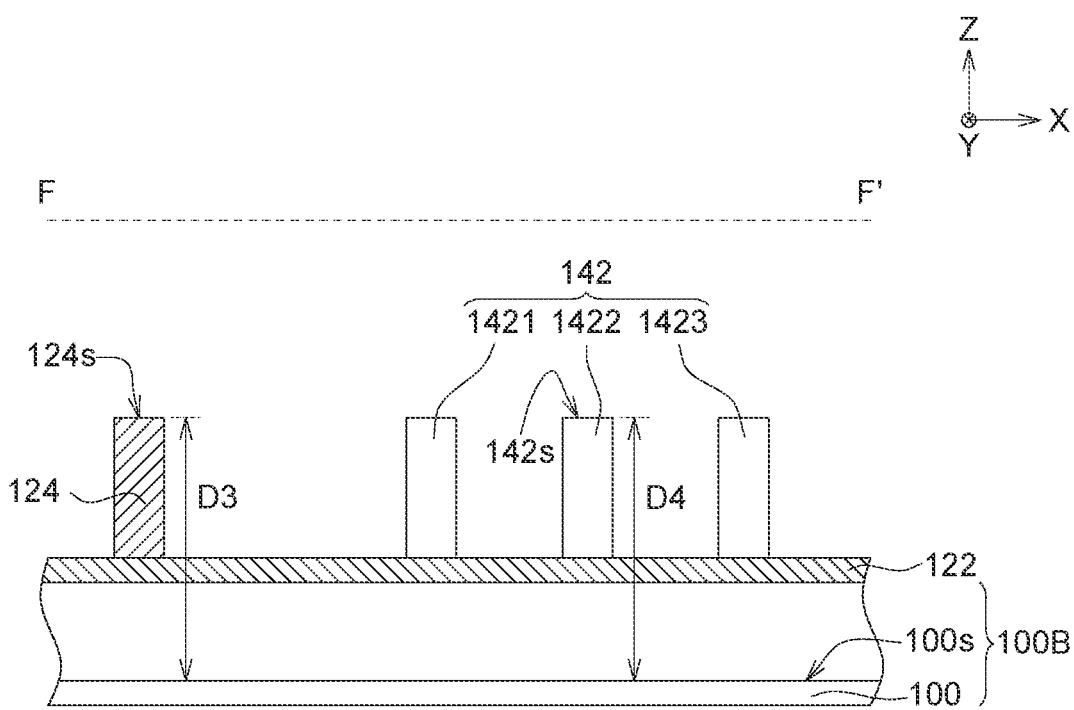
FIG. 8B is a cross-sectional view taken along the line F-F' in FIG. 8A according to an embodiment of the present invention.
Figure 8C:
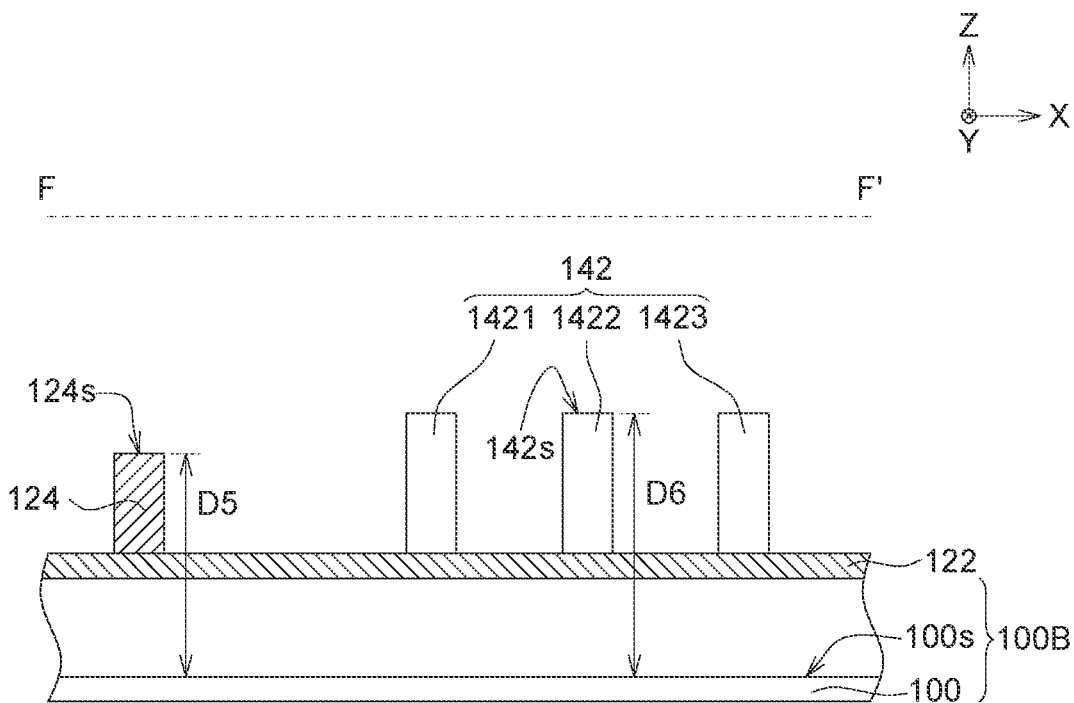
FIG. 8C is a cross-sectional view taken along the line F-F' in FIG. 8A according to a further embodiment of the present invention.

FIG. 8A is a top view showing an electrophoretic display device 30 according to a further embodiment of the present invention, for example, showing a plane formed by the first direction and the second direction. FIG. 8B shows a cross-sectional view taken along the line F-F' of FIG. 8A according to an embodiment of the present invention, and FIG. 8C shows a cross-sectional view taken along line F-F' in FIG. 8A according to a further embodiment of the present invention, for example, showing the plane formed by the first direction and the third direction. In order to explain the present invention more clearly, FIGS. 8A to 8C only show the spacer wall 124 and sidewalls 142, and most other components are omitted. The difference between the electrophoretic display device 30 and the electrophoretic display device 10 is in that the non-display area AB is further provided with sidewalls 142.

Referring to FIGS. 8A and 8B, the backplane structure 100B includes a display area AA and a non-display area AB. The non-display area AB surrounds the display area AA, and the spacer wall 124 corresponds to the display area AA and a portion of the non-display area AB. In the present embodiment, the buffer layer 122 extends in the display area AA and the non-display area AB, exposing the chip bonding area (not shown), and the spacer wall 124 of the closed patterns 124P formed in the hexagonal shapes extends from the display area AA to a portion of the non-display area AB. In the non-display area AB, the outermost spacer wall 124 may not be able to form the closed patterns 124P in a complete shape. The sidewalls 142 are disposed on the buffer layer 122 in the non-display area AA (for example, the frame area) and surround the spacer wall 124. Each of the sidewalls 142 can continuously extend to form a closed pattern. In the present embodiment, the number of sidewalls 142 is three, including a first side wall 1421, a second side wall 1422, and a third side wall 1423. However, the present invention is not limited thereto, and the number of sidewalls 142 can be one, two, four or other suitable amount.

In an embodiment, the spacer wall 124 and the sidewalls 142 can be finished in the same process, and the material of the spacer wall 124 can be the same as the material of the sidewalls 142. For example, in the step of forming the spacer wall 124 on the buffer layer 122 (as the steps shown in FIGS. 4A and 4B), it further includes simultaneously forming the sidewalls 142 in the non-display area AB by the same lithography process. A distance D3 in the third direction between the upper surface 124s of the spacer wall 124 and the upper surface 100s of the lower substrate 100 may be the same as a distance D4 in the third direction between an upper surface 142s of the side walls 142 and the upper surface 100s of the lower substrate 100, as shown in FIG. 8B.

In a further embodiment, the spacer wall 124 and the sidewalls 142 can be finished under different manufacturing processes, and the material of the spacer wall 124 can be the same or different from the material of the side walls 142. For example, after the step of forming the spacer wall 124 on the buffer layer 122 (such as the steps shown in FIGS. 4A and 4B), the sidewalls 142 are formed in the non-display area AB by another lithography process. The distance D3 in the third direction between the upper surface 124s of the spacer wall 124 and the upper surface 100s of the lower substrate 100 may be the same as the distance D4 in the third direction between the upper surface 142s of the sidewalls 142 and the upper surface 100s of the lower substrate 100, as shown in FIG. 8B, but the present invention is not limited thereto. In other embodiments, the distance between the upper surface 124s of the spacer wall 124 and the upper surface 100s of the lower substrate 100 in the third direction may be different from the distance between the upper surface 142s of the sidewalls 142 and the upper surface 100s of the lower substrate 100 in the third direction. As shown in FIG. 8C, a distance D5 between the upper surface 124s of the spacer wall 124 and the upper surface 100s of the lower substrate 100 in the third direction is smaller than a distance D6 between the upper surface 142s of the sidewalls 142 and the upper surface 100s of the lower substrate 100 in the third direction.

Compared with the embodiment without the sidewalls 142, since the electrophoretic display device 30 is further provided with the sidewalls 142 in the non-display area AB, the display medium DM can be more effectively prevented from overflowing to the outside during the manufacturing process of the electrophoretic display device 30 (for example, in the step of filling the display medium DM).

Figure 9A:
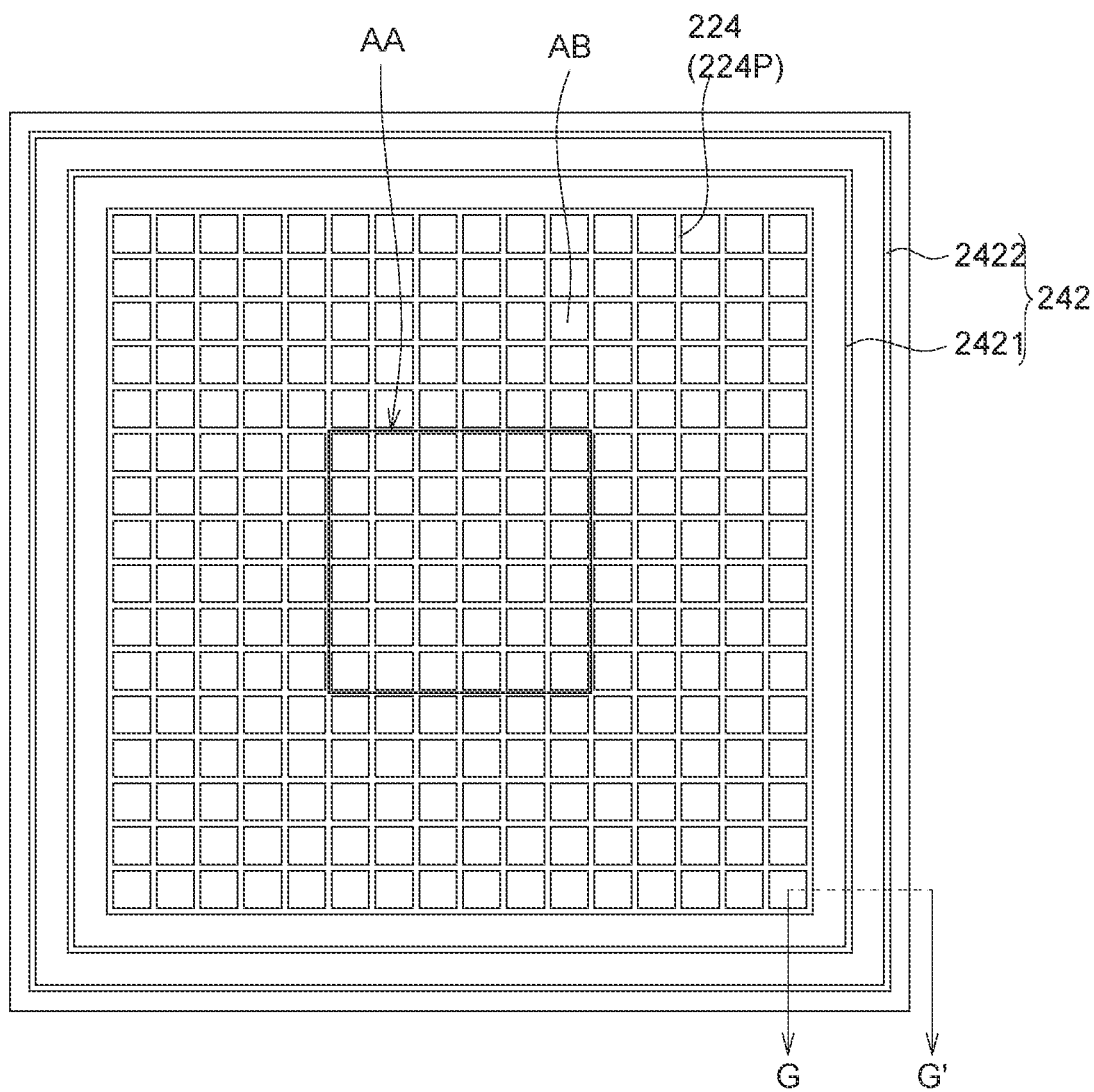
FIG. 9A is a top view showing an electrophoretic display device according to a further embodiment of the present invention.
Figure 9B:
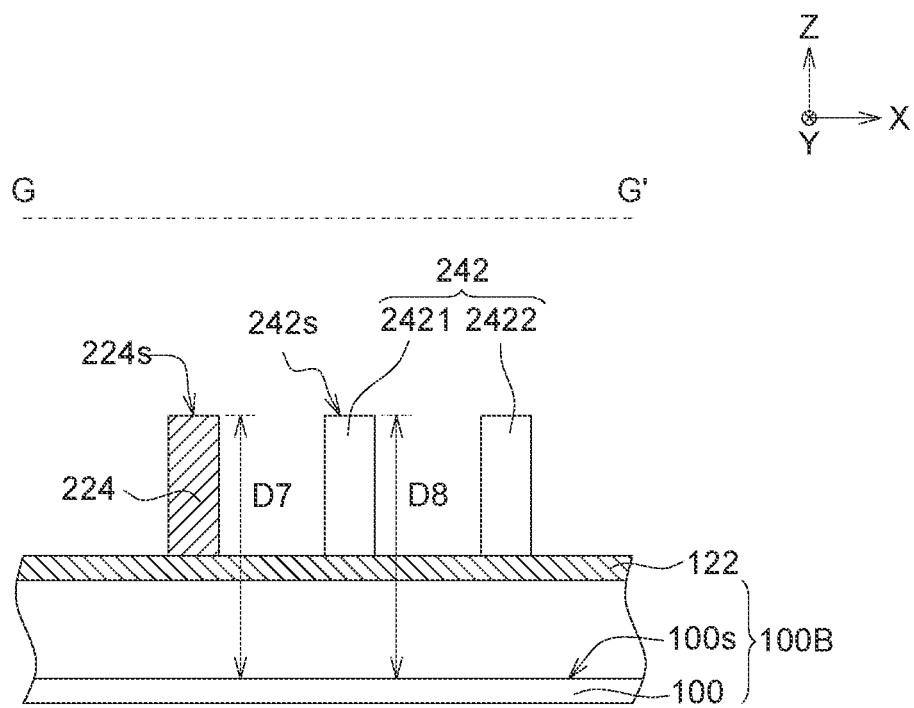
FIG. 9B is a cross-sectional view taken along the line G-G' in FIG. 9A according to an embodiment of the present invention.
Figure 9C:
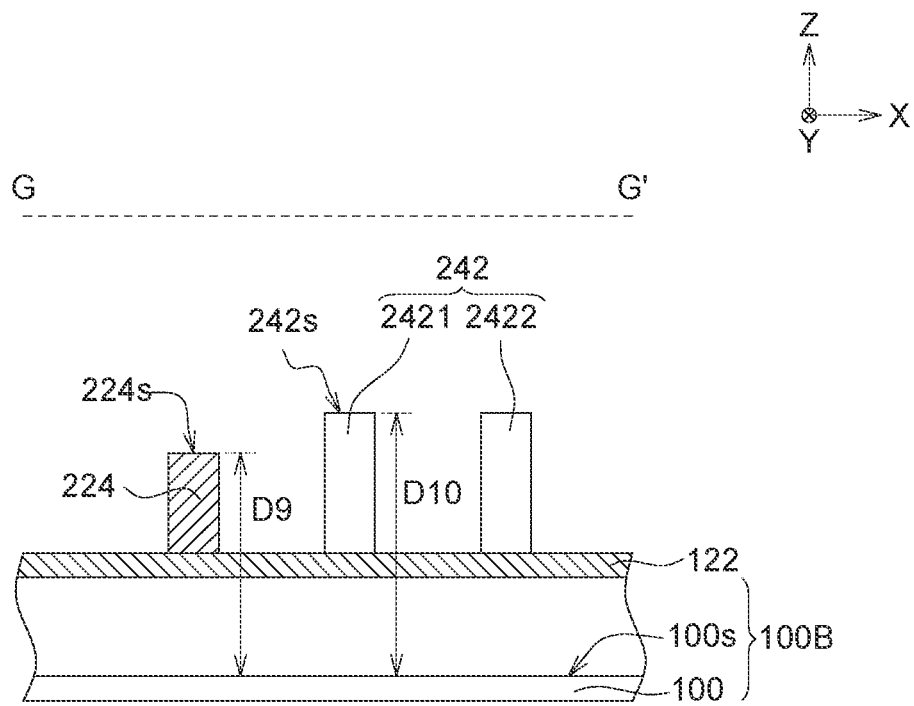
FIG. 9C is a cross-sectional view taken along the line G-G' in FIG. 9A according to a further embodiment of the present invention.

FIG. 9A is a top view showing an electrophoretic display device 40 according to a further embodiment of the present invention, for example, showing a plane formed by the first direction and the second direction. FIG. 9B is a cross-sectional view taken along the line G-G' in FIG. 9A according to an embodiment of the present invention; FIG. 9C is a cross-sectional view taken along the line G-G' in FIG. 9A according to a further embodiment of the present invention, for example, showing a plane formed by the first direction and the third direction. In order to explain the present invention more clearly, FIGS. 9A to 9C only show the spacer wall 224 and sidewalls 242, and most other components are omitted. The difference between the electrophoretic display device 40 (as shown in FIG. 9A) and the electrophoretic display device 20 (as shown in FIG. 6A to FIG. 7) is that the non-display area AB is further provided with sidewalls 242. In addition, the difference between the electrophoretic display device 40 and the electrophoretic display device 30 (as shown in FIG. 8A) is that the closed patterns 224P formed by the spacer wall 224 has a different geometry in the top view, and the number of sidewalls 242 is also different.

Referring to FIGS. 9A and 9B, the backplane structure 100B includes a display area AA and a non-display area AB. The non-display area AB surrounds the display area AA, and the spacer wall 224 corresponds to the display area AA and a portion of the non-display area AB. In the present embodiment, the buffer layer 122 extends in the display area AA and the non-display area AB, exposes the chip bonding area (not shown), and the spacer wall 224 of closed patterns 224P formed into rectangular shapes extends from the display area AA to a portion of the non-display area AB. The sidewalls 242 are disposed on the buffer layer 122 in the non-display area AA (for example, the frame area) and surround the spacer wall 224. Each of the sidewalls 242 can continuously extend to form a closed pattern. In the present embodiment, the number of sidewalls 242 is two, including a first side wall 2421 and a second side wall 2422. However, the present invention is not limited thereto. The number of sidewalls 242 can be one, three, four, or other suitable amount.

In an embodiment, the spacer wall 224 and the sidewalls 242 can be finished in the same manufacturing process, and the material of the spacer wall 224 can be the same as the material of the sidewalls 242. For example, in the step of forming the spacer wall 224 on the buffer layer 122 (as shown in FIGS. 6A and 6B), it further includes simultaneously forming the sidewalls 242 in the non-display area AB by the same lithography process. A distance D7 between an upper surface 224s of the spacer wall 224 and the upper surface 100s of the lower substrate 100 in the third direction may be the same as a distance D8 between an upper surface 242s of the sidewalls 242 and the upper surface 100s of the lower substrate 100 in the third direction, as shown in FIG. 9B.

In a further embodiment, the spacer wall 224 and the sidewalls 242 can be finished under different manufacturing processes, and the material of the spacer wall 224 can be the same or different from the material of the sidewalls 242. For example, after the step of forming the spacer wall 224 on the buffer layer 122 (such as the steps shown in FIGS. 6A and 6B), the sidewalls 242 are formed in the non-display area AB by another lithography process. The distance D7 between the upper surface 224s of the spacer wall 224 and the upper surface 100s of the lower substrate 100 in the third direction may be the same as the distance D8 between the upper surface 242s of the sidewalls 242 and the upper surface 100s of the lower substrate 100 in the third direction, as shown in FIG. 9B, but the present invention is not limited thereto. In other embodiments, the distance between the upper surface 224s of the spacer wall 224 and the upper surface 100s of the lower substrate 100 in the third direction may be different from the distance between the upper surface 242s of the sidewalls 242 and the upper surface 100s of the lower substrate 100 in the third direction. As shown in FIG. 9C, the distance D9 between the upper surface 224s of the spacer wall 224 and the upper surface 100s of the lower substrate 100 in the third direction is smaller than the distance D10 between the upper surface 242s of the sidewalls 242 and the upper surface 100s of the lower substrate 100 in the third direction.

Compared with the embodiment without the sidewalls 242, since the electrophoretic display device 40 is further provided with the sidewalls 242 in the non-display area AB, the display medium DM can be more effectively prevented from overflowing to the outside during the manufacturing process of the electrophoretic display device 40 (for example, in the step of filling the display medium DM).

According to an embodiment of the present invention, an electrophoretic display device and a method for manufacturing the same are provided. The electrophoretic display device includes a backplane structure, a buffer layer, a spacer wall, a display medium, an upper substrate and an upper electrode. The backplane structure includes a lower substrate, a transistor formed on the lower substrate, and a lower electrode electrically connected to the transistor. The buffer layer is disposed on the backplane structure. The spacer wall is disposed on the buffer layer and forms a closed pattern. The display medium is disposed in the closed pattern. The display medium includes an electrophoretic medium and a plurality of electrophoretic particles dispersed in the electrophoretic medium. The upper substrate is disposed on the spacer wall and the display medium. The upper electrode is disposed between the upper substrate and the spacer wall.

Compared with the comparative example in which the front plane laminate is torn off from the release layer after the structure of the front plane laminate is formed, and the adhesive layer of the front plane laminate and the backplane structure are pressed together, since all structures (such as the backplane structure, a buffer layer, a spacer wall, and a display medium) of the electrophoretic display device in the present application are processed and integrated on a single substrate (that is, the lower substrate), and the process efficiency is better, which can improve the problems of complicated, time-consuming and high-cost process. In addition, compared with the comparative example without a buffer layer, since the electrophoretic display device of the present application has a buffer layer, the buffer layer can provide better adhesion between the spacer wall and the backplane structure, so that the spacer wall is not easily peeled off from the backplane structure. Thus, the structure of the electrophoretic display device of the present application can be more stable and can have better display quality.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electrophoretic display device, comprising:
    a backplane structure, comprising a lower substrate, a transistor formed on the lower substrate, and a lower electrode electrically connected to the transistor;
    a buffer layer, disposed on the backplane structure;
    a spacer wall, disposed on the buffer layer and forming a plurality of closed patterns, wherein the spacer wall corresponds to a display area and a non-display area surrounding the display area, the buffer layer extends in the display area and the non-display area, and the spacer wall extends from the display area to a portion of the non-display area;
    a display medium, disposed in the plurality of closed patterns, wherein the display medium comprises an electrophoretic medium and a plurality of electrophoretic particles dispersed in the electrophoretic medium;
    an upper substrate, disposed on the spacer wall and the display medium;
    an upper electrode, disposed between the upper substrate and the spacer wall; and
    at least one sidewall, disposed on the buffer layer in the non-display area and enclosing the outermost spacer wall,
    wherein the plurality of closed patterns are each a complete shape, and are disposed in the display area and the non-display area.

2. The electrophoretic display device according to claim 1, wherein the plurality of closed patterns are polygons in a top view.

3. The electrophoretic display device according to claim 2, wherein shapes of the plurality of closed patterns are the same as each other.

4. The electrophoretic display device according to claim 1, wherein the plurality of closed patterns are formed by arrangements of at least one type of polygons in a top view.

5. The electrophoretic display device according to claim 1, wherein the lower substrate has an upper surface, and an angle between the spacer wall and the upper surface is between 80 degrees and 90 degrees.

6. The electrophoretic display device according to claim 1, wherein the buffer layer is disposed between the spacer wall and the lower electrode.

7. The electrophoretic display device according to claim 1, wherein the spacer wall directly contacts the buffer layer.

8. The electrophoretic display device according to claim 1, wherein a material of the spacer wall comprises a photoresist material, and a material of the buffer layer comprises a dielectric material.

9. The electrophoretic display device according to claim 1, wherein a material of the spacer wall and a material of the sidewall are the same as each other.

10. The electrophoretic display device according to claim 1, wherein a material of the spacer wall and a material of the sidewall are different from each other.

11. The electrophoretic display device according to claim 1, further comprising an encapsulation layer, wherein the encapsulation layer is disposed on the spacer wall and the display medium, and is disposed between the upper electrode and the spacer wall.

* * * * *